United States Patent
Elsaesser et al.

(10) Patent No.: US 12,190,567 B2
(45) Date of Patent: Jan. 7, 2025

(54) DIGITAL CONTRAST POST-PROCESSING OF MICROSCOPY IMAGES

(71) Applicant: Carl Zeiss Microscopy GmbH, Jena (DE)

(72) Inventors: Rebecca Elsaesser, Jena (DE); Wibke Hellmich, Jena (DE); Alexander Freytag, Erfurt (DE); Volker Doering, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 414 days.

(21) Appl. No.: 17/830,607

(22) Filed: Jun. 2, 2022

(65) Prior Publication Data
US 2022/0392200 A1 Dec. 8, 2022

(30) Foreign Application Priority Data
Jun. 2, 2021 (DE) .......................... 102021114307.1

(51) Int. Cl.
*G06K 9/00* (2022.01)
*A61K 35/12* (2015.01)
(Continued)

(52) U.S. Cl.
CPC ....... *G06V 10/774* (2022.01); *G01N 21/6428* (2013.01); *G06T 7/0014* (2013.01); *G06V 10/776* (2022.01); *G01N 2021/6439* (2013.01); *G06T 2207/10056* (2013.01); *G06T 2207/20081* (2013.01); *G06T 2207/20084* (2013.01); *G06T 2207/30004* (2013.01); *G06T 2207/30204* (2013.01)

(58) Field of Classification Search
CPC ......... G06K 9/00; G06V 10/774; A61K 35/12
USPC ....... 382/100, 103, 106, 123, 128–134, 156, 382/162, 168, 173, 181, 209, 219, 224, 382/254, 276, 285–291, 305, 312; 250/459.1, 311
See application file for complete search history.

(56) References Cited

U.S. PATENT DOCUMENTS 9,786,050 B2 * 10/2017 Bhargava ............... G06V 20/69
10,013,760 B2 * 7/2018 Bhargava .............. G06T 7/0014
(Continued)

FOREIGN PATENT DOCUMENTS

DE 102020203290 A1 9/2021
EP 3553165 A1 10/2019

OTHER PUBLICATIONS

Christiansen et al.: "In Silico Labeling: Predicting Fluorescent Labels in Unlabeled Images", Cell, 2018, doi: https://doi.org/10.1016/j.cell.2018.03.040.
(Continued)

*Primary Examiner* — Seyed H Azarian
(74) *Attorney, Agent, or Firm* — KUSNER & JAFFE

(57) ABSTRACT

A prediction algorithm determines synthetic fluorescence images on the basis of measurement images. A validation of the synthetic fluorescence images can be effected on the basis of reference images which are captured after the measurement images or are captured for a separate sample. Alternatively or additionally, a training of the prediction algorithm can be effected on the basis of training images which are captured after the measurement images or are captured for a separate sample.

10 Claims, 7 Drawing Sheets

(51) Int. Cl.
  *G01N 21/64*    (2006.01)
  *G06T 7/00*     (2017.01)
  *G06V 10/774*   (2022.01)
  *G06V 10/776*   (2022.01)
  *G06V 20/69*    (2022.01)

(56) References Cited

U.S. PATENT DOCUMENTS

| | | | | |
|---|---|---|---|---|
| 2015/0286042 | A1* | 10/2015 | Hilbert | G02B 21/0076 250/459.1 |
| 2022/0236550 | A1* | 7/2022 | Keller | G02B 21/0032 |
| 2022/0392200 | A1* | 12/2022 | Elsaesser | G06T 7/0014 |
| 2023/0030424 | A1* | 2/2023 | Ozcan | G06F 18/24137 |

OTHER PUBLICATIONS

Prakash, Mangal, et al. "Removing Pixel Noises and Spatial Artifacts with Generative Diversity Denoising Methods." arXiv preprint arXiv:2104.01374 (2021).

Wagner, Nils, et al. "Deep learning-enhanced light-field imaging with continuous validation." Nature Methods 18.5 (2021): 557-563.

Christiansen, Eric M., et al. "In silico labeling: predicting fluorescent labels in unlabeled images." *Cell* 173.3 (2018): 792-803.

Ounkomol, Chawin, et al. "Labelfree prediction of three-dimensional fluorescence images from transmitted-light microscopy." *Nature methods* 15.11 (2018): 917-920.

Ronneberger, O., Fischer, P., & Brox, T. (Oct. 2015). U-net: Convolutional networks for biomedical image segmentation. In *International Conference on Medical image computing and computer-assisted intervention* (pp. 234-241).

Weigert, Martin, et al. "Content-aware image restoration: pushing the limits of fluorescence microscopy." *Nature methods* 15.12 (2018): 1090-1097.

German Search Report (with English translation) dated Jan. 10, 2022 from German Priority Patent Application No. DE102021114307.1.

* cited by examiner

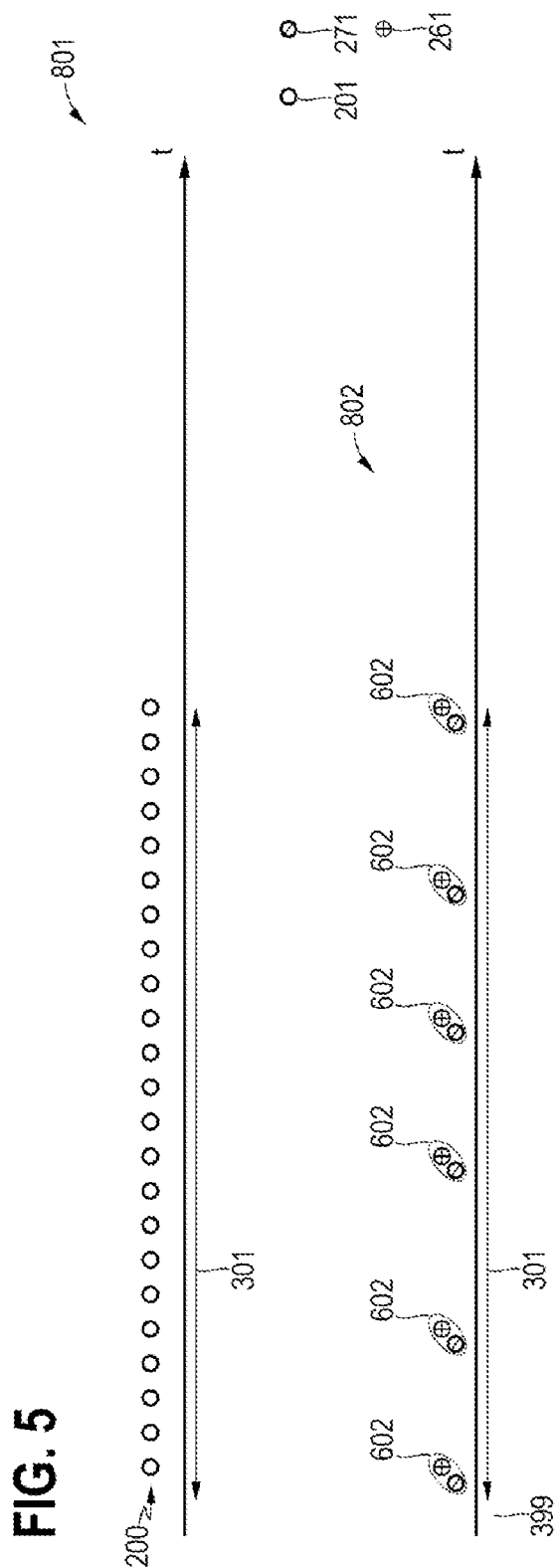

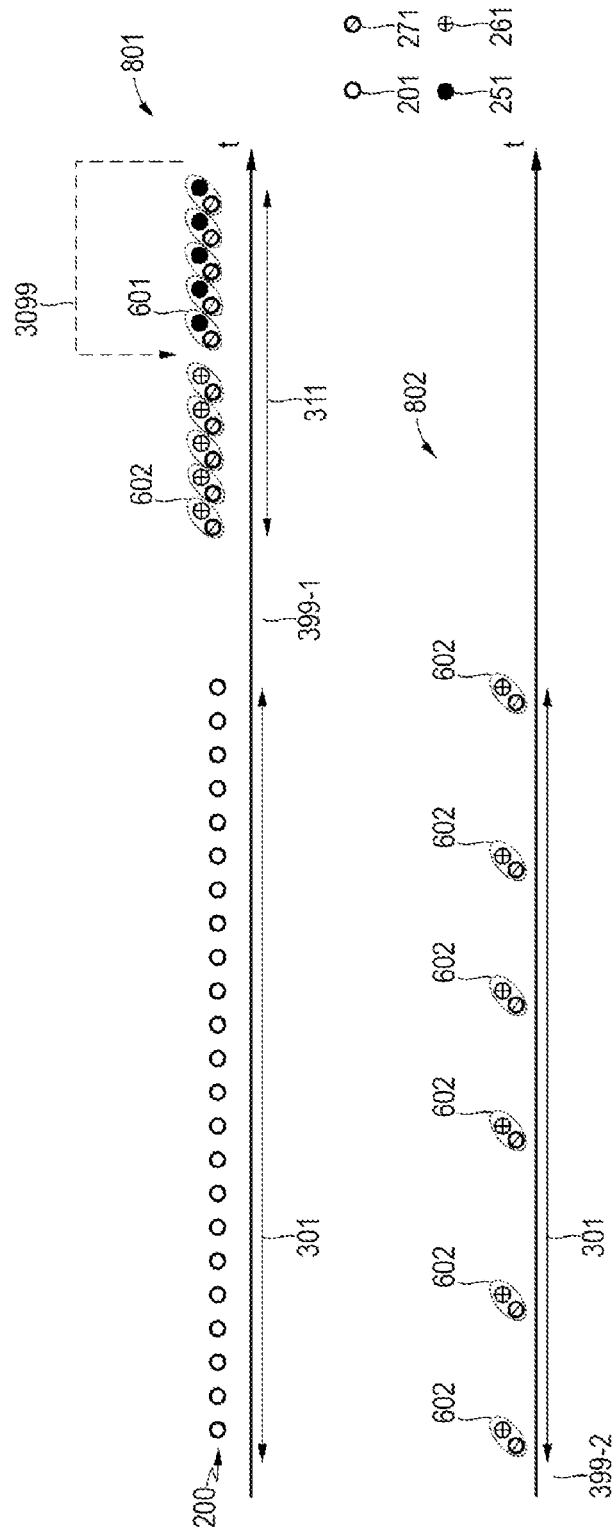

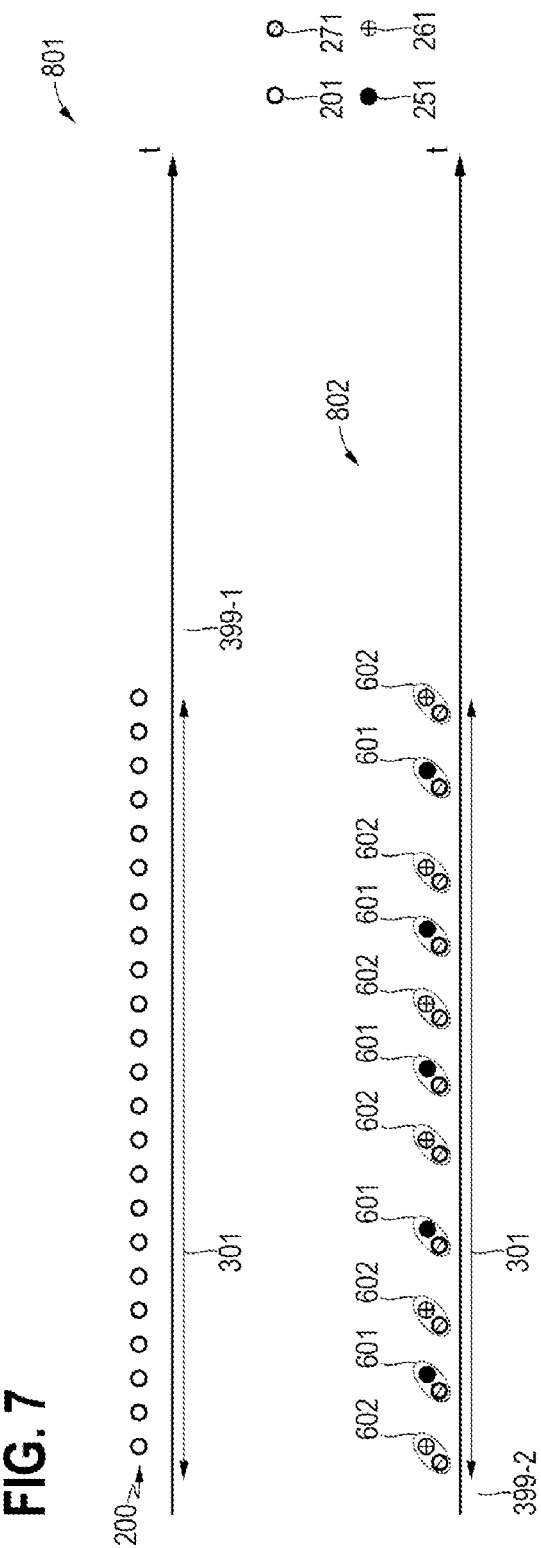

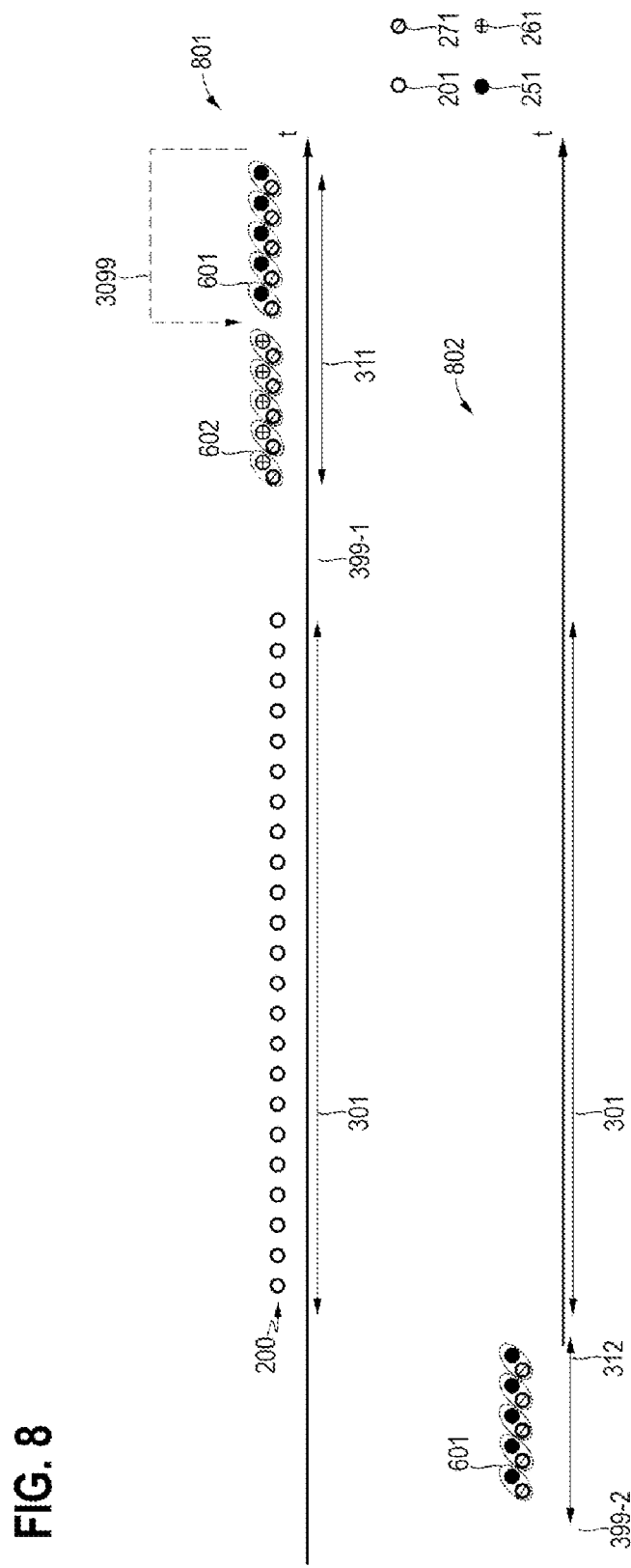

DIGITAL CONTRAST POST-PROCESSING OF MICROSCOPY IMAGES

FIELD OF THE INVENTION

Various examples of the disclosure generally relate to techniques for the digital post-processing of measurement images which are captured with a microscopic imaging modality. In particular, synthetic fluorescence images can be determined.

BACKGROUND OF THE INVENTION

Fluorescence imaging is used in various fields of the "life sciences". By means of fluorescence imaging it is possible to recognize regions and structures in biological samples with great sensitivity and specificity. In this case, the specificity is achieved by means of markers that are designed to specifically bind to specific molecules or cell structures. The specificity can also be achieved by means of markers that are activated only in specific chemical environments. An external activation would be possible, for example by addition of chemical substances or action of light. The specificity can also be achieved by means of markers that are present and/or produced themselves in the cell. This may concern autofluorescence, for example, or markers after a suitable genetic manipulation step. The sensitivity is achieved by means of the fluorescence of the markers at specific wavelengths. As a result, it is possible to filter the signal in the spectral range.

A marker typically comprises fluorophores or consists of a fluorophore. A fluorophore is a molecule whose electron shell can be excited by means of light at a specific wavelength and then emits light at a longer wavelength. The use of fluorophores makes it possible to separate excitation and light emission in the spectrum. As a result, it is possible to measure a signal that includes only a small proportion of background light. As a result, a high signal-to-noise ratio (SNR) can be obtained.

These two advantages of fluorescence imaging—that is to say specificity and sensitivity—make it possible to identify cell structures of a specific type and/or specific molecules in a corresponding ensemble, for example the cell nucleus or DNA. A further application concerns the recognition of a tumour, for example.

Disadvantages may occur when using microscopic fluorescence imaging. For example, so-called photobleaching occurs on account of exposure with light for exciting the fluorescence. In this case, a fluorophore loses its ability to fluoresce. The use of light for exciting the fluorescence may also cause phototoxicity. That means that the cell structures of a corresponding sample may be damaged. The experiment may be corrupted as a result. Moreover, it may happen that the markers themselves degrade over time, e.g. bleaching. A change in the staining may then occur as a function of time, which may corrupt the measurement result.

Techniques are known for producing a fluorescence contrast by means of digital contrast post-processing of microscopy images. By way of example, a machine-learned algorithm can be used for this purpose. However, such techniques have specific disadvantages. By way of example, the quality of the corresponding synthetic fluorescence images may be poor or unknown.

Such disadvantages have also been observed in the case of other types of digital contrast post-processing which are different from that for the generation of synthetic fluorescence images.

The following publications are known: EP3553165A1; Wagner, Nils, et al. "Deep learning-enhanced light-field imaging with continuous validation." Nature Methods 18.5 (2021):557-563.

SUMMARY OF THE INVENTION

Therefore, there is a need for improved techniques for the digital contrast post-processing of microscopy images.

This object is achieved by the features of the independent patent claims. The features of the dependent patent claims define embodiments.

Some examples described herein are based generally on the insight that the traditional hardware-based fluorescence imaging, by virtue of the use of light for exciting the fluorescence, may have a great influence on the behaviour of the samples examined, in particular on the behaviour of cells. On the other hand, the methods described herein are based on the insight that other imaging modalities are less invasive since reduced exposure of the sample to light is necessary and/or less harmful wavelengths can be used in order to capture corresponding image data. The examples described herein are furthermore based on the insight that such less invasive imaging modalities also exhibit a correlation between the contrast of corresponding measurement images and a contrast that would be expected for corresponding fluorescence images. Therefore, by means of imaging modalities that are not very invasive—for example conventional bright field transmitted-light microscopy—it is possible to capture measurement images without compromising the integrity of the sample. In particular, it is possible to capture even a very large number of measurement images, for example with a high temporal resolution.

Digital contrast post-processing can then be effected by means of a prediction algorithm. On the basis of measurement images and using the prediction algorithm, it is possible to generate in particular synthetic images having a contrast that is characteristic of a specific imaging modality—e.g. fluorescence imaging—without this imaging modality itself having to be implemented.

In particular, various examples in association with the determination of synthetic fluorescence images are described below. In principle, however, the techniques disclosed can also be used in association with the simulation of other imaging modalities.

Some examples described herein are furthermore based on the insight that with the use of a prediction algorithm for determining synthetic fluorescence images, often it is not possible to estimate, or it is possible to estimate only with difficulty, how reliably the prediction algorithm determines the synthetic fluorescence images. By way of example, it may be unclear whether the contrast included in the synthetic fluorescence images correctly characterizes the sample or else is of artificial nature. That means that a resilience of information included in the synthetic fluorescence images may be unclear.

Some examples described herein are additionally based on the insight that sometimes a situation may occur in which, after the end of a biological experiment, it is found that a prediction algorithm does not yield good results. That means that the contrast of the synthetic fluorescence images may not correctly characterize the sample or may characterize it only to a restricted extent.

Finally, techniques described herein are based on the insight that a prediction algorithm parametrized on the basis of general training data often cannot yield particularly good results, i.e. the synthetic fluorescence images have a contrast that significantly deviates from the expected contrast and does not reproduce specific physical properties of the sample, or reproduces them in a corrupted manner.

Techniques which make it possible to overcome such disadvantages are described below. Techniques which make it possible to validate the synthetic fluorescence images and/or the prediction algorithm are described below. In accordance with some examples described herein, it may additionally be possible to adapt the prediction algorithm if a result of a corresponding validation indicates inaccuracies. High-quality synthetic fluorescence images can be determined as a result. Moreover, it is possible to capture synthetic fluorescence images with a high scanning rate or image refresh rate.

One method comprises driving at least one imaging device in order to capture a plurality of measurement images of a biological sample by means of microscopic imaging during an observation period. The method additionally comprises driving the at least one imaging device in order to capture a plurality of reference images of the biological sample stained with a marker by means of microscopic fluorescence imaging after the observation period during a calibration period. Capturing the plurality of reference images is thus effected after a staining process performed on the biological sample for the purpose of staining the biological sample with the marker for the microscopic fluorescence imaging has been carried out after the observation period. The method additionally comprises driving the at least one imaging device in order to capture further measurement images of the biological sample stained with the marker by means of the microscopic imaging during the calibration period. Furthermore, the method comprises determining synthetic fluorescence images on the basis of the measurement images and on the basis of a prediction algorithm.

The method can be computer-implemented.

By means of the further measurement images and the reference images, it would be possible, in principle, to validate and/or to train the synthetic fluorescence images and/or the prediction algorithm.

For the validating it would be possible to determine further synthetic fluorescence images on the basis of at least one portion of the further measurement images and on the basis of the prediction algorithm. The validation of the synthetic fluorescence images can then be effected on the basis of a comparison between the reference images and the further synthetic fluorescence images.

As an alternative or in addition to such a validation, it would also be possible for the prediction algorithm—which would then be machine-learned—to be trained. In such a case, the reference images used for the training may also be referred to as training images. Moreover, it is possible to carry out a training of parameters of the machine-learned prediction algorithm on the basis of the training images as ground truth and at least one corresponding portion of the further measurement images.

In principle, however, it would be possible to capture dedicated training images, for example also during the calibration period, and to image the sample for which the measurement images are also captured. However, it would also be conceivable to capture training images for a further sample in a further calibration period or during the observation period.

A computer program or a computer program product or a computer-readable storage medium comprises program code. The program code can be loaded and executed by a processor. This causes the processor to perform a method. The method comprises driving at least one imaging device in order to capture a plurality of measurement images of a biological sample by means of microscopic imaging during an observation period. The method additionally comprises driving the at least one imaging device in order to capture a plurality of reference images of the biological sample stained with a marker by means of microscopic fluorescence imaging after the observation period during a calibration period. Capturing the plurality of reference images is thus effected after a staining process performed on the biological sample for the purpose of staining the biological sample with the marker for the microscopic fluorescence imaging has been carried out after the observation period. The method additionally comprises driving the at least one imaging device in order to capture further measurement images of the biological sample stained with the marker by means of the microscopic imaging during the calibration period. Furthermore, the method comprises determining synthetic fluorescence images on the basis of the measurement images and on the basis of a prediction algorithm.

One method comprises driving at least one imaging device in order to capture a plurality of measurement images of a biological sample by means of microscopic imaging during an observation period. In addition, the method also comprises driving the at least one imaging device in order to capture a plurality of reference images of a further biological sample stained with a marker by means of microscopic fluorescence imaging during the observation period, with which marker the biological sample (for which the measurement images are captured) is not stained; however, the biological sample could be stained with a different marker. In addition, the method also comprises driving the at least one imaging device in order to capture further measurement images of the further biological sample stained with the marker by means of the microscopic imaging during the observation period. The method comprises determining synthetic fluorescence images on the basis of the measurement images and on the basis of a prediction algorithm. The method furthermore comprises determining further synthetic fluorescence images on the basis of at least one portion of the further measurement images and on the basis of the prediction algorithm.

It would then be possible for the prediction algorithm to be validated and/or trained on the basis of the further synthetic fluorescence images.

In this case, carrying out a validation of the synthetic fluorescence images can be effected on the basis of a comparison between the reference images and the further synthetic fluorescence images.

Alternatively or additionally, carrying out a training of parameters of a then machine-learned prediction algorithm could be effected on the basis of the corresponding reference images (which may then be referred to as training images) with the further synthetic fluorescence images.

A computer program or a computer program product or a computer-readable storage medium comprises program code. The program code can be loaded and executed by a processor. This causes the processor to perform a method. The method comprises driving at least one imaging device in order to capture a plurality of measurement images of a biological sample by means of microscopic imaging during an observation period. In addition, the method also comprises driving the at least one imaging device in order to capture a plurality of reference images of a further biological sample stained with a marker by means of microscopic fluorescence imaging during the observation period, with which marker the biological sample (for which the measurement images are captured) is not stained; however, the biological sample could be stained with a different marker. In addition, the method also comprises driving the at least one imaging device in order to capture further measurement images of the further biological sample stained with the marker by means of the microscopic imaging during the observation period. The method comprises determining synthetic fluorescence images on the basis of the measurement images and on the basis of a prediction algorithm. The method furthermore comprises determining further synthetic fluorescence images on the basis of at least one portion of the further measurement images and on the basis of the prediction algorithm.

A device comprises a processor. The latter is configured to drive at least one imaging device in order to capture a plurality of measurement images of a biological sample by means of microscopic imaging during an observation period. In addition, the processor is configured—after a staining process performed on the biological sample for the purpose of staining the biological sample with a marker for microscopic fluorescence imaging has been carried out after the observation period—to drive the at least one imaging device in order to capture a plurality of reference images of the biological sample stained with the marker by means of the microscopic fluorescence imaging after the observation period during a calibration period. The processor is additionally configured to drive the at least one imaging device in order to capture further measurement images of the biological sample stained with the marker by means of the microscopic imaging during the calibration period. In addition, the processor is configured to determine synthetic fluorescence images on the basis of the measurement images and also on the basis of a prediction algorithm. The processor is also configured to determine further synthetic fluorescence images on the basis of at least one portion of the further measurement images and on the basis of the prediction algorithm. In addition, the processor is configured to carry out a validation of the synthetic fluorescence images on the basis of a comparison between the reference images and the further synthetic fluorescence images.

One device comprises a processor configured to drive at least one imaging device in order to capture a plurality of measurement images of a biological sample by means of microscopic imaging during an observation period. The biological sample is not stained with a specific marker during the observation period. The processor is also configured to drive the at least one imaging device in order to capture a plurality of reference images of a further biological sample stained with the specific marker by means of microscopic fluorescence imaging during the observation period. The processor is also configured to drive the at least one imaging device in order to capture further measurement images of the further biological sample stained with the marker by means of the microscopic imaging during the observation period. The processor is also configured to determine synthetic fluorescence images on the basis of the measurement images and on the basis of a prediction algorithm. The processor is also configured to determine further synthetic fluorescence images on the basis of the further measurement images and on the basis of the prediction algorithm. The processor is also configured to carry out a validation of the synthetic fluorescence images on the basis of a comparison between the reference images and the further synthetic fluorescence images.

The features set out above and features that are described below can be used not only in the corresponding combinations explicitly set out, but also in further combinations or in isolation, without departing from the scope of protection of the present invention.

BRIEF DESCRIPTION OF THE DRAWINGS

FIG. 5 illustrates by way of example and schematically a temporal arrangement of capturing measurement images and capturing reference images.

FIG. 6 illustrates by way of example and schematically a temporal arrangement of capturing measurement images and capturing reference images.

FIG. 7 illustrates by way of example and schematically a temporal arrangement of capturing measurement images and capturing reference images.

FIG. 8 illustrates by way of example and schematically a temporal arrangement of capturing measurement images and capturing reference images.

DETAILED DESCRIPTION OF THE INVENTION

Figure 1:
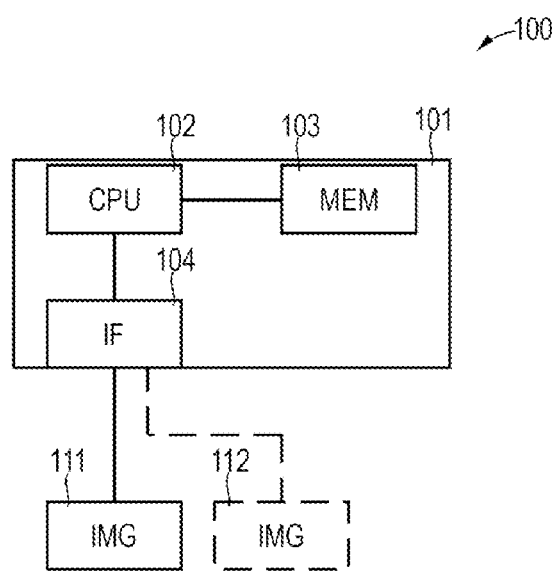
FIG. 1 illustrates a system comprising at least one imaging device and a device for the digital post-processing of images captured by the at least one imaging device.

The properties, features and advantages of this invention described above and the way in which they are achieved will become clearer and more clearly understood in association with the following description of the exemplary embodiments which are explained in greater detail in association with the drawings.

The present invention is explained in greater detail below on the basis of preferred embodiments with reference to the drawings. In the figures, identical reference signs denote identical or similar elements. The figures are schematic representations of various embodiments of the invention. Elements illustrated in the figures are not necessarily illustrated as true to scale. Rather, the various elements illustrated in the figures are rendered in such a way that their function and general purpose become comprehensible to the person skilled in the art. Connections and couplings between functional units and elements as illustrated in the figures can also be implemented as an indirect connection or coupling. A connection or coupling can be implemented in a wired or wireless manner. Functional units can be implemented as hardware, software or a combination of hardware and software.

Techniques for digitally post-processing the contrast of measurement images of biological samples are described below. In particular, by means of the techniques described herein it may be possible to generate in a computer-implemented manner synthetic images which simulate a contrast of a specific imaging modality, without the corresponding imaging modality actually having to be applied.

In accordance with various examples described herein, it is possible to generate synthetic images which simulate the imaging of stained samples (referred to as "virtual staining"). During such imaging of stained samples, the biological sample is conventionally stained with a corresponding stain. This is effected in a staining process. This involves bringing a stain into contact with the sample. The stain includes one or more markers. Such markers generate a specific contrast in the imaging. By way of example, the markers could specifically bind to specific cell parts, e.g. to the cell nucleus or mitochondria. Tumour tissue could be made visible by means of the markers. Markers would be conceivable, for example, which are activated by illumination with a specific wavelength and then emit light at a different wavelength, that is to say fluorescence markers.

As a further general rule, a wide variety of types of samples can be examined in the examples described herein. Biological samples can be examined. By way of example, it would be possible to examine living or fixed cells, e.g. in a tissue sample. Cell cultures, for example, could be examined. The biological sample may thus denote a biological model system, e.g. cells or spheroids (i.e. clusters of general cells, e.g. of tumours or nerve cells) or organoids (i.e. clusters of organ-specific cells) or else organisms or entire organs. The biological sample can thus comprise in particular cells or tissue. A cell culture can be examined. By way of example, a primary cell culture could be examined, i.e. cells obtained from an organism and kept alive. Fixed cells could also be examined. Said sample thus comprises e.g. an ensemble of cell structures.

In particular, techniques in association with fluorescence imaging are described below. These techniques make it possible to determine synthetic fluorescence images. Fluorescence images have a contrast that characteristically represents specific cell structures from a multiplicity of cell structures with high specificity and sensitivity. In this way it is possible to differentiate cell structures of one specific type from other cell structures of other types.

While various techniques are described below in particular in association with the staining of samples for fluorescence imaging, in other examples it would also be possible to use the staining for other fields of application, e.g. histopathology.

Techniques are described below which combine traditional measurement techniques for fluorescence imaging, that is to say e.g. wavelength-selective excitation of fluorescence and wavelength-selective detection of fluorescence of cell structures by means of suitable measurement hardware, with techniques of digital contrast post-processing of measurement images.

Such a combination of traditional hardware-based measurement techniques with digital contrast post-processing makes it possible firstly to determine high-quality fluorescence images and secondly to reduce effects such as photobleaching and phototoxicity that are caused by the excitation of the fluorescence by exposure to light. In particular, it is possible to achieve an optimum of the image quality—that is to say a particularly high reliability that the fluorescence images have the required sensitivity and specificity with regard to cell structures of a specific type. By reducing photobleaching and phototoxicity, moreover, longer observation periods can be made possible, for example in comparison with traditional hardware-based techniques of fluorescence imaging. It is also possible to achieve a higher temporal resolution, i.e. more images per unit time. Moreover, it may be possible to reduce influences on the physiology of the sample, such that the measurement results are influenced or corrupted to a lesser extent.

By means of the techniques described herein it is also possible to reliably check whether synthetic fluorescence images have a desired accuracy. In particular, it is possible for example to check whether a prediction algorithm used to determine the synthetic fluorescence images makes proper predictions. That means that a validation of the synthetic fluorescence images and/or of the prediction algorithm is made possible.

The prediction algorithm can utilize a correlation between an image contrast of the measurement images and an image contrast of fluorescence images. Such a technique may also be referred to as "virtual staining" since the contrast of the measurement images is changed or amplified by the digital post-processing by means of the prediction algorithm, such that the synthetic fluorescence image is obtained. Various advantages can be achieved by means of such virtual staining, for example a reduced exposure time, a reduced time for scanning the sample, an increased SNR, a reduced phototoxicity, reduced experimental outlay, etc.

In accordance with various examples, a sequence of measurement images of a biological sample is captured during an observation period by means of microscopic imaging. A prediction algorithm is then used to generate a sequence of synthetic fluorescence images for the sequence of the measurement images. That means, therefore, that the contrast of the measurement images (i.e. the pixel values which encode e.g. colour and/or brightness) is digitally post-processed by means of the prediction algorithm.

In this case, different types of prediction algorithms can be used in the various examples disclosed. In principle, the prediction algorithm could be parametrized e.g. manually, i.e. could be suitably set for example by way of suitable prior user knowledge. However, it would also be conceivable for the prediction algorithm to be machine-learned. A corresponding training can then be carried out in a computer-implemented manner. For example, artificial neural networks (ANNs) can be used here. An ANN comprises a multiplicity of layers which perform different operations. One example of an ANN is a convolutional neural network, which makes use of convolutional layers that carry out a convolution of input values with a kernel. The various layers can be connected to one another by way of suitable weights. Nonlinear activations are conceivable. Pooling operations can be carried out: information is discarded therein. One example is maxpooling, where only the strongest values of a region (e.g. 2×2 neurons) are retained. ANNs can have a feedforward architecture. Here the result of one layer is only ever forwarded to a further layer. If so-called jump connections are present, the output of one layer can be forwarded to a plurality of subsequent layers. In principle, different types of ANNs can be used, e.g. in particular also generative adversarial networks (GANs) or autoencoder networks, e.g. variational autoencoder networks.

In accordance with various examples, in addition to the measurement images, reference images and also further measurement images assigned to the reference images are captured. In other words, pairs of reference images and further measurement images are captured.

As a general rule, it would be possible, but not necessary, for the image pairs described herein, i.e. e.g. comprising the further measurement images and the reference images, to be captured in a narrow temporal context. However, it would also be possible for there to be a relatively large temporal offset between the images of a pair.

The reference images are captured by means of fluorescence imaging here. The reference images intrinsically show the contrast that is emulated or is intended to be emulated by the synthetic fluorescence images. These pairs of reference images and further measurement images are used for a validation of the measurement images. This validation of the measurement images can be effected on the basis of a comparison between further synthetic fluorescence images—which are determined on the basis of the further measurement images and using the prediction algorithm—and the reference images. That means, therefore, that a quality of the synthetic measurement images is deduced on the basis of the comparison between the further synthetic fluorescence images and the reference images.

As a general rule, there are various possibilities here for capturing the reference images in relation to the measurement images, specifically from a spatial standpoint and/or a temporal standpoint. Two exemplary variants are described in TAB. 1.

TABLE 1

Different variants for capturing the reference images for the validation of a prediction algorithm. The two examples I and II can also be combined with one another.

| | Capturing reference images with respect to measurement images | Exemplary details |
|---|---|---|
| I | Temporally downstream | The reference images can be captured after the conclusion of the measurement, i.e. after an observation period. The reference images can thus be implemented during a calibration period downstream of the observation period.<br>During the calibration period, from the same sample which was also the subject of the capture of the measurement images in the observation period, the reference images can be captured, by means of fluorescence imaging.<br>These reference images can serve as a basis for a validation of the measurement images captured during the observation period. For this purpose, during the calibration period, further measurement images can also be captured and further synthetic fluorescence images can be determined on the basis of the further measurement images and the prediction algorithm. A validation can then be carried out, on the basis of a comparison of the further synthetic fluorescence images with the reference images.<br>For this purpose, between the observation period and the calibration period, the sample can be stained, with one or more suitable markers that are emulated by the prediction algorithm. In principle, staining could also be effected using a different marker, which causes e.g. a contrast that correlates well with the contrast of the synthetic fluorescence image. That means that the sample is stained with the marker only after the observation period, said marker being stimulated by the fluorescence imaging. That means that the measurement images for the biological experiment can be completely captured before the sample is stained. |
| II | Spatial separation | In some examples it would also be conceivable for the reference images to be captured temporally in parallel with the measurement images, that is to say also during the observation period. That means that it would be possible for the measurement images to be captured during the observation period for the sample-and for the reference images (together with further measurement images) to be captured from a further sample during the observation period. In this case, the further sample can be stained with a marker during the observation period.<br>For example, it would be conceivable for the further sample and the sample to be arranged in different wells of a multi-well plate, and thus for both the measurement images of the sample and the reference images of the further sample to be able to be captured continuously during the observation period by means of an imaging device. For example, both the sample and the further sample can be arranged within a field of view of a microscope.<br>The sample and the further sample can concern the same biological experiment. For example, it would be conceivable for the sample and the further sample both to contain cell cultures that were prepared by means of the same preparation process. By way of example, the sample and the further sample could include fixed cell cultures of the same tissue sample. |

TABLE 1-continued

Different variants for capturing the reference images for the validation of a prediction algorithm. The two examples I and II can also be combined with one another.

In principle, it is thus possible—as described in TAB. 1—for capturing the measurement images and capturing the reference images to be temporally and/or spatially separated from one another. This has a number of advantages that are described below.

The measurement images can be captured by means of the microscopic imaging during the observation period in such a way that effects such as photobleaching and phototoxicity turn out to be comparatively smaller per measurement image than per reference image. That means that the imaging modality of the microscopic imaging that is used for capturing the measurement images is comparatively not very invasive, in particular in comparison with the fluorescence imaging used for capturing the reference images. The sample is thus not subjected to severe loading during the observation period, the physiology is influenced to a lesser extent, and the experiment is therefore corrupted to a lesser extent.

In addition, it may be possible not to stain the sample during the observation period, that is to say that the staining with a specific marker optionally takes place only after the observation period. This is because the staining process can also result in influencing of the sample, either by the marker itself and/or by sample handling associated with the staining. By way of example, it was observed that an interaction between the sample and the marker takes place particularly during long-term measurements. By way of example, the cell physiology may be changed or disturbed, by the staining process and/or the marker. As a result, invasive steps are not carried out until after the measurement.

In some examples, the sample could also be stained during the observation period, for example with a different marker that is less invasive, that is to say causes no or only a smaller change in the structure or physiology of the sample compared with the marker used for the fluorescence imaging in association with capturing the reference images.

For example, it would be possible—as a general rule—to capture measurement images by means of a conventional transmitted-light microscope. It is possible to use bright field imaging. Dark field imaging or a phase contrast, for example a differential phase contrast, could also be used. Further examples concern holography imaging, holotomography, quantitative phase tomography, optical coherence tomography, dynamic optical coherence tomography, angle-selective illumination imaging, phase gradient imaging, structured illumination imaging. A further example concerns capturing the measurement images with a high dynamic range by using a burst mode (i.e. a short time interval between raw images of a series of images, which in particular is smaller than the time scale of the dynamic range of the sample) with different exposure times (HDR imaging). That means that per measurement image a plurality of raw images can be captured, which have different exposure times and can then be combined to form a measurement image.

The microscopic imaging for the measurement images can thus use an imaging modality different from fluorescence imaging. Here the preprocessing algorithm implements an image-to-image (I2I) prediction algorithm that translates a first contrast (e.g. bright field transmitted-light imaging) into a second contrast (fluorescence).

In some examples, however, it would also be conceivable for fluorescence imaging to be used as imaging modality for capturing the measurement images—e.g. with a different marker from that for the reference images, and/or with lower excitation, and/or without a marker with autofluorescence (e.g. the excitation of haemoglobin native to the sample). The values of the exposure parameters (e.g. light intensity and/or exposure time) of the fluorescence imaging that are used for capturing the measurement images can be configured, however, such that the light loading of the sample or exposure of the sample to light is lower per measurement image and per area of the sample than as a result of the imaging parameters of the fluorescence imaging that are used for capturing the reference images. To put it another way, that means that the effects of photobleaching and phototoxicity can be smaller per measurement image than per reference image, even though in principle the same imaging modality of fluorescence imaging is used for capturing both the measurement images and the reference images. For example, it would also be conceivable for markers activated for capturing the measurement images to be different from those activated for capturing the reference images. For example, markers that can be activated with a smaller quantity of light or less invasively could be used for capturing the reference images. However, in principle, a further, second fluorescence contrast could also be predicted on the basis of a first fluorescence contrast, such that the exposure to light can be reduced overall. For example, a tdTomato marker and corresponding fluorescence contrast could be predicted on the basis of a "green fluorescent protein" (GFP) marker and corresponding fluorescence contrast. For example, a more areal staining could be used in order to produce a structurally more specific staining. By way of example, a cytoskeleton staining could be used for predicting "focal adhesions".

If fluorescence imaging is also used for capturing the measurement images, said fluorescence imaging causing a reduced exposure to light, however, then this typically means that the fluorescence measurement images obtained in this way have a relatively low SNR. One example would be e.g. the use of a—e.g. comparatively not very invasive—marker for the measurement images that provides qualitatively the same fluorescence contrast as a different marker used for the reference images; but with poorer image quality. In such a scenario, the synthetic fluorescence images may then have an increased SNR in comparison with the measurement images. Therefore, in such a scenario, the prediction algorithm is also sometimes referred to as a denoising algorithm.

The observation period—during which the measurement images can finally be captured—can be coordinated in particular with the underlying biological behaviour of the sample. That means that during the observation period one or more biological change processes may take place at cell structures of an ensemble of cell structures of the sample. Such change processes may be induced externally or be initiated by the sample itself. In this case, the objective of the measurement or of the experiment is to examine such biological change processes.

It is possible for said one or more biological change processes still to be active during a downstream calibration period as well (cf. TAB. 1: Example I). Said one or more biological change processes may also take place on the further sample during the observation period (cf. TAB. 1: Example II). In this respect, therefore, the reference images and firstly the further measurement images, and also secondly the measurement images, may represent the same experiment.

Various techniques are based on the insight that reference techniques for the virtual staining of cell structures may have specific disadvantages. Such reference techniques are described e.g. in: Christiansen, Eric M., et al. "In silico labeling: predicting fluorescent labels in unlabeled images." *Cell* 173.3 (2018): 792-803; and also Ounkomol, Chawin, et al. "Label-free prediction of three-dimensional fluorescence images from transmitted-light microscopy." *Nature methods* 15.11 (2018): 917-920. In the case of such reference techniques, the parametrization of the prediction algorithm is carried out on the basis of a reference measurement on an entirely separate sample or before the actual measurement. The parametrized prediction algorithm is then used to determine the synthetic fluorescence images on the basis of the measurement images captured during the observation period of the measurements of the actual sample. In the reference techniques, however, no further reference images are then captured during the observation period. Such reference techniques have the disadvantage that the separate reference measurement is necessary. This can be time-intensive. A user has to implement a separate workflow for carrying out the reference measurement. This requires time, user abilities and additional implementation outlay. Such reference techniques furthermore have the disadvantage that discrepancies between the reference measurement and the actual measurements of the sample may often occur. With the use of different samples firstly for parametrizing the prediction algorithm and secondly for carrying out the measurement, it can happen that the parametrization of the prediction algorithm does not match the measurement. This can be the case for example on account of different preparation of the samples. It could also be the case as a result of different imaging modalities for capturing the measurement images in the reference measurement and the actual measurement. If techniques of supervised learning are used for machine-learned prediction algorithms, for example, this means that a large number of training data must be captured and annotated. That can be particularly complex.

In the case of reference techniques, moreover, the disadvantage may occur that a validation of the quality of the prediction of the prediction algorithm, that is to say a validation of the quality of the synthetic fluorescence images, is not possible, or is possible only to a restricted extent. That means that a user cannot check the information content of the synthetic reference images. This could have the effect, for example, that incorrect diagnoses or incorrect derived measurement variables are determined on the basis of the synthetic fluorescence images. This may also have an influence on the dependability of corresponding methods, for example if the subsequent data evaluation is compromised as a result.

The techniques described herein make it possible to overcome or alleviate such disadvantages.

FIG. 1 schematically illustrates a system 100 in accordance with various examples. The system 100 comprises a device 101. The device 101 could be for example a computer or a server. The device 101 comprises a processor 102 and a memory 103. The device 101 also comprises an interface 104. Via the interface 104, the device 101 can receive image data, for example measurement images and/or reference images, from one or more imaging devices 111, 112. The processor 102 could also transmit control data via the interface 104 to said one or more imaging devices 111, 112 in order to drive the latter for capturing image data. By means of the control data, the processor 102 could also set the values of one or more imaging parameters, for example illumination parameters.

Put generally, the processor 102 can be configured to load control instructions from the memory 103 and to execute them. When the processor 102 loads and executes the control instructions, this has the effect that the processor 102 performs techniques such as are described herein. Such techniques will include for example driving the imaging device 111 and optionally the imaging device 112 in order to capture image data. For example, the processor 102 could be configured to drive the imaging device 111 in order to capture a sequence of measurement images of a sample by means of microscopic imaging during an observation period. The processor 102 can also be configured to drive the imaging device 111 in order to capture a plurality of reference images of the sample during the same observation period or during a downstream calibration period (cf. TAB. 1). In principle, the reference images can be captured by means of the same imaging modality as the measurement images. Depending on the capability of the imaging device 111 concerning the imaging modality used for capturing the reference images, the processor 102 can also drive the imaging device 112 in order to capture the reference images.

Moreover, the processor 102, on the basis of the control instructions from the memory 103, can be configured to determine synthetic fluorescence images on the basis of the measurement images and on the basis of a prediction algorithm. That means that the processor 102 can carry out virtual staining or other image-to-image transformations such as e.g. denoising.

Finally, the processor 102 can be configured to validate the prediction algorithm on the basis of at least one portion of the reference images. The processor 102 could optionally also be configured to train the prediction algorithm on the basis of one or more training images.

Figure 2:
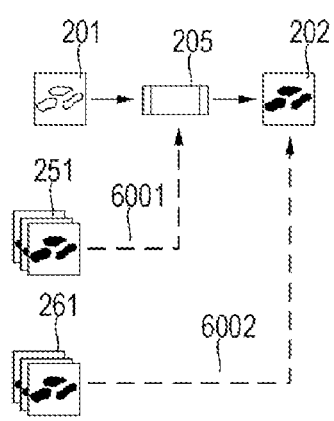
FIG. 2 schematically illustrates digital contrast post-processing of measurement images captured by at least one imaging device.

FIG. 2 schematically illustrates aspects in association with the virtual staining of measurement images 201 representing a sample, wherein the sample comprises e.g. an ensemble of cell structures. A measurement image 201 serves as input for a prediction algorithm 205, which yields a synthetic fluorescence image 202 as output. Training images 251 are used for the (re-)training 6001 of the prediction algorithm 205; however, the prediction algorithm 205 could also already have been finally pretrained. Reference images 261 are used for the validation 6002 of the synthetic fluorescence images 202 (cf. TAB. 1).

In principle, the training images 251 and also the reference images 261 can be captured by means of the same imaging modality. That means, in particular, that at the point in time of capturing it is not yet necessary to stipulate whether a corresponding image is used as training image or as reference image.

The prediction algorithm could be implemented by an ANN, for example. The architecture of the ANN could be implemented e.g. according to Christiansen, Eric M., et al. "In silico labeling: predicting fluorescent labels in unlabeled images." *Cell* 173.3 (2018): 792-803; or Ounkomol, Chawin, et al. "Label-free prediction of three-dimensional fluorescence images from transmitted-light microscopy." *Nature methods* 15.11 (2018): 917-920.

A further architecture could be implemented in accordance with a U-net having convolutional layers and jump connections that skip specific layers. See e.g. Ronneberger, O., Fischer, P., & Brox, T. (2015, October). U-net: Convolutional networks for biomedical image segmentation. In *International Conference on Medical image computing and computer-assisted intervention* (pp. 234-241). Springer, Cham; in which case, however, a greyscale value regression is used as output, instead of a classification layer (in order to obtain an image-to-image prediction). The U-net could also be trained with an additional adversarial loss contribution. That is also referred to as "Conditional Generative Adversarial Net".

A further example would be e.g. autoencoder networks, e.g. variational autoencoder networks.

Figure 3:
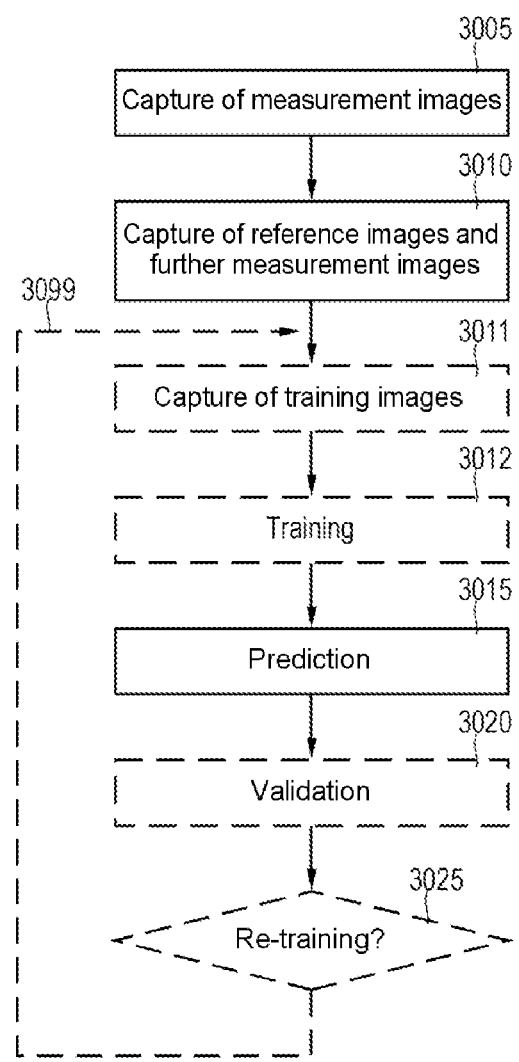
FIG. 3 is a flowchart of one exemplary method.

FIG. 3 is a flowchart of one exemplary method. For example, the method could be performed by an apparatus comprising a processor and a memory when the processor loads control instructions from the memory and executes them. For example, the method in accordance with FIG. 3 could be performed by the apparatus 101 from FIG. 1, particularly by the processor 102 when the latter loads program code from the memory 103.

In box 3005, a plurality of measurement images are captured during an observation period in a corresponding measurement. The measurement images are captured by means of one or more imaging modalities. The measurement images represent a biological sample comprising e.g. an ensemble of cell structures. In this case, the cell structures may be subjected to a biological change process. Said biological change process may occur in a manner distributed over the ensemble and the observation period. The aim of the measurement may thus be to represent or to measure said biological change process. Put more generally, the aim of the measurement may be to characterize the biological sample.

The biological sample may be unstained during box 3005. The sample could also be stained with a marker that makes possible a different fluorescence contrast from the fluorescence contrast predicted later in box 3015.

Since the biological change process occurs in a distributed manner in terms of time period and in terms of position space, that is to say can be observed at different positions at different points in time, it may be helpful to capture the measurement images with a high repetition rate. That means that many measurement images are captured per unit time. Alternatively or additionally, the measurement images can also be captured with a high position space density, that is to say that e.g. a Z-stack of measurement images can be captured (repeatedly). What can be achieved as a result is that the biological change process can be represented in a close-meshed fashion. This may be helpful particularly if a time duration of each individual occurrence of the biological change process is much shorter than the temporal variation of the occurrence of the biological change processes in the ensemble.

For the purpose of capturing the measurement images 3005, the apparatus can suitably drive a corresponding imaging device. For example, the processor could transmit control commands to the imaging device. The control commands can be indicative of points in time for initiating the exposure and/or values of one or more illumination parameters.

In box 3010, reference images are captured. The reference images can be captured for example after the observation period in a separate calibration period, cf. TAB. 1: Example I. The distribution of the occurrence of the change process for the cell ensemble may also have a significant frequency in the calibration period. Alternatively or additionally, it would also be conceivable for the reference images to be captured temporally in parallel with the measurement images, but in a spatially separated manner, that is to say for example from a further sample; cf. TAB. 1: Example II.

Moreover, in box 3010, further measurement images are also captured. Said further measurement images are captured as pairs with the reference images. That means that the further measurement images can be captured in direct succession with the reference images during the calibration period (TAB. 1: Example I); and/or can be captured from the further sample in direct succession with the reference images (TAB. 2: Example II).

The further measurement images can be captured with the same imaging modality as the measurement images from box 3005. For example, the same optical path can be used.

In principle, imaging modalities other than fluorescence imaging can be used for capturing the measurement images in box 3005 and/or the further measurement images in box 3010. However, fluorescence imaging could also be used for capturing the measurement images and/or the further measurement images, in which case other values can then be used for one or more exposure parameters, such that the light loading per measurement image is less than the light loading per reference image. Alternatively or additionally, a different marker could also be used, which is activated e.g. by light having a different wavelength, compared with the marker for the reference images: Specifically, the reference images are captured by means of microscopic fluorescence imaging as imaging modality. That means that for the purpose of capturing the reference images, the cell structures are excited by means of suitable light, i.e. in a manner coordinated with an electronic excitation state of fluorophores in a corresponding marker. The wavelength of the light is coordinated with the corresponding excitation energy of fluorophores. Before the calibration period (TAB. 1: Example I), therefore, the sample can be stained with the respective marker; and/or the further sample can be stained before the observation period (TAB. 2: Example II).

It is optionally conceivable for training images to be captured in box 3011. This could be effected during the calibration period, for example, during which the reference images and the further measurement images are also captured (box 3010; TAB. 1, example I). The training images could also be captured from the further sample in a corresponding calibration period or during the observation period (box 3010; TAB. 1, example II). For example, such samples could have cell cultures obtained by the same preparation process.

The training images serve as ground truth for at least one portion of the further measurement images from box 3010 and can be used for training a machine-learned prediction algorithm, e.g. an ANN. In order to determine the pairs between training images and the further measurement images which are used for ascertaining the value of the loss function on the basis of a corresponding comparison, the distance between the training images and further measurement images in terms of time period and/or position space can be taken into account. For example, a training image could serve as ground truth for a further measurement image if the training image and the further measurement image represent the same region of the sample or further sample and were captured with a small temporal distance. A small temporal distance may denote such a temporal distance which is so short that the biological change process cannot occur, or can occur only with a sufficiently low probability. For example, it may be desirable for a temporal distance between capturing a further measurement image and capturing a training image of a pair to be not greater than 1 second, optionally not greater than 500 ms, further optionally not greater than 10 ms. That is based on the insight that such time scales are short enough that a significant change in the fluorescence contrast is not expected. In principle, however, significantly longer temporal distances would also be conceivable.

Sometimes it may be possible for the training image and the further measurement image to represent inherently substantially the same region of the sample with the same pose. This may be the case if the same imaging optical unit is used—that would be the case for example in the example in FIG. 1 if a specific lens of the imaging device 111 is used both for capturing the training images and for capturing the further measurement images. If different imaging optical units are used, it may be necessary to register the image pairs respectively with one another, that is to say to effect an assignment of corresponding sample locations in the images.

In box 3012, the machine-learned prediction algorithm can then be trained on the basis of at least one portion of the further measurement images and the training images. Machine learning techniques can be used for training the prediction algorithm. For example, an ANN could be trained. That means that for example a gradient descent method can be used to adapt the parameter values of the prediction algorithm proceeding from a value of a loss function on the basis of a comparison (for example a pixel comparison) between the respective training image and the associated further measurement image. Non-supervised or unsupervised learning can be used. Supervised or partially supervised learning could also be used.

Supervised learning means that associated input images and output images are present, or that a given image can be uniquely assigned to the set of input images or to the set of output images. It does not imply, however, that a human has to make a contribution in some way during supervised learning, for instance as in the case of a semantic segmentation.

Various loss functions can be used, e.g. a sum of the squares of the deviations between pixel values. A so-called backpropagation can be used for adapting the parameter values.

Boxes 3011 and 3012 are optional. This is the case because it would also be possible for the prediction algorithm to be trained on an entirely separate sample or separate samples (i.e. these separate samples concern other cell cultures, are prepared differently, etc.), e.g. by the manufacturer.

In box 3015, a prediction is effected, that is to say that synthetic fluorescence images are determined on the basis of the measurement images from box 3005; in addition, further synthetic fluorescence images are determined on the basis of at least one portion of the further measurement images from box 3010 (for this purpose, e.g. that portion of the further measurement images is used which is not used for the training in box 3012). The prediction algorithm is in each case used for this purpose. The prediction algorithm can be trained in accordance with box 3011 and box 3012 for this purpose.

The prediction of the synthetic fluorescence images can be carried out here, in principle, retrospectively after the end of the experiment, that is to say in particular after the conclusion of a corresponding observation period. However, it would optionally also be possible for the synthetic fluorescence images to be determined on the basis of the prediction algorithm in the corresponding training stage as early as during the observation period. By way of example, capturing measurement images and determining synthetic fluorescence images on the basis of said measurement images could be effected in a temporally coordinated manner, that is to say that a measurement image becoming available can in each case initiate the process of determining the corresponding synthetic fluorescence image. Real-time prediction of the synthetic fluorescence images would be possible.

The validation of the measurement images from box 3005 or of the functioning of the prediction algorithm can then be carried out in box 3020. In this case, the further synthetic fluorescence images are compared with the reference images from box 3010. That means that for example a correspondence between the reference images and the respectively associated further synthetic fluorescence images can be determined, in each case for pairs of reference images and further measurement images.

For example, individual pixels can be compared with one another and a deviation of the corresponding colour or brightness values can be ascertained. It may once again be expedient to determine the pairs of further synthetic fluorescence images and reference images on the basis of a distance in terms of time period and/or position space, as already explained above in association with box 3012 with the training images. Such images which have a particularly small distance in terms of time period and/or position space can be compared with one another for the validation. If different sample regions and/or different poses of the imaging optical unit in relation to a sample region are used, it may once again be helpful to carry out a registration between the further measurement images and the reference images of the pairs.

In principle, the validation in box 3020 is also optional. By way of example, scenarios would be conceivable in which, on the basis of corresponding training images, only a training of the prediction algorithm is carried out in box 3012, but no validation.

In optional box 3025, renewed implementation of boxes 3011, 3015 and 3020 can then be effected depending on a result of the validation from box 3025. A corresponding loop 3099 is illustrated in FIG. 3. That means that driving an imaging device in order that, by means of the microscopic fluorescence imaging, additional training images are captured and moreover additional further measurement images are captured, and also carrying out the training in box 3021 can be carried out iteratively, for example until the validation in box 3020 was successful. A successful validation may be defined e.g. by the fact that a correspondence (in accordance with a predefined metric) between the further synthetic fluorescence images and the reference images exceeds a predefined threshold value. Other termination criteria could also be taken into account, e.g. a predefined number of iterations, etc.

By means of the method from FIG. 3, disadvantages such as have been described above in association with the traditional, exclusively hardware-based fluorescence imaging can be overcome. Furthermore, disadvantages such as have been described above in association with reference implementations for virtual staining can be overcome.

It is also possible to alleviate disadvantages of reference techniques in association with digital contrast post-processing for denoising; see e.g. Weigert, Martin, et al. "Content-aware image restoration: pushing the limits of fluorescence microscopy." *Nature methods* 15.12 (2018): 1090-1097; or Prakash, Mangal, et al. "Removing Pixel Noises and Spatial Artifacts with Generative Diversity Denoising Methods." *arXiv preprint arXiv:* 2104.01374 (2021).

In particular, it is possible for the sample or at least parts of the sample to be virtually stained, that is to say that the result accords with the result of the reference techniques for virtual staining with a separate reference measurement.

By means of the techniques described, it is possible to image the sample with a high image resolution, in which case, however, an imaging modality that is not very invasive is used for capturing the measurement images. Moreover, the sample can be imaged with a high temporal resolution since the light exposure per measurement image is comparatively low in the case of the imaging modality that is not very invasive.

The reliability of the prediction of the synthetic fluorescence images can also be validated. In particular, independent reference images can be used to assess the quality of the prediction. In particular, it is possible to check whether the prediction of the prediction algorithm is biologically correct or has artefacts of a customary nature. It is possible to check whether specific quantifications of properties of the biological sample are possible within the scope of a required confidence.

It is possible to make the training of the prediction algorithm sample-specific.

Staining of the sample before the observation period can thus be dispensed with. As a result, the physiology of the cell remains undisturbed during the observation period. Moreover, the exposure of the sample to light that is required for the fluorescence imaging can be reduced. As a result, the photon load can be significantly reduced and the toxicity during the observation period can be decreased.

Finally, it would be conceivable for the measurement images to be captured with a particularly high scanning rate in box 3005, since it is not necessary to capture in an interposed manner reference images and/or further measurement images and/or training images in accordance with box 3010 and box 3011. Nevertheless, a validation and/or a training of the prediction algorithm can be effected directly in relation to the sample. If necessary, further training data sets can be acquired in a targeted manner by means of loop 3099.

Figure 4:
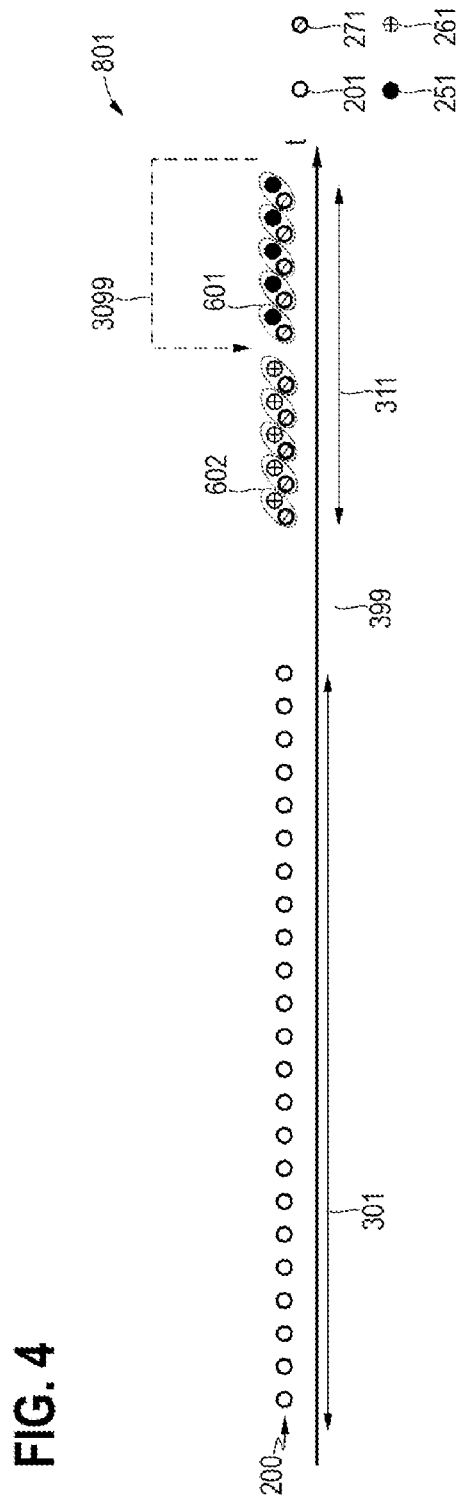
FIG. 4 illustrates by way of example and schematically a temporal arrangement of capturing measurement images and capturing reference images.

FIG. 4 illustrates aspects with regard to the capturing of measurement images 201 and the capturing of training images 251 (optional) for the training and the capturing of reference images 261 for the validating of a prediction algorithm. In particular, FIG. 4 illustrates aspects with regard to a corresponding temporal arrangement in relation to an observation period 301. FIG. 4 is one exemplary implementation of the techniques in accordance with Tab. 1: Example I.

All images are captured from a sample 801 in FIG. 4.

FIG. 4 illustrates that, during the observation period 301, a sequence 200 of the measurement images 201 is captured with an approximately identical scanning rate for the sample 801. At the same time, the reference images 261 are captured from the same sample 801 for the validation exclusively during a calibration period 311 (could also be referred to as calibration phase), arranged after the end of the observation period 301. Between the observation period 301 and the calibration period 311, the sample is stained at 399. That is to say that a marker is introduced which enables fluorescence imaging for the purpose of capturing the reference images 261.

During the calibration period 311, further measurement images 271 are captured as well, such that pairs 602 of corresponding further measurement images 271 and reference images 261 can be formed, which can be used for validating the prediction algorithm.

Optionally, it would also be possible to capture training images 251 and associated further measurement images 271 during the calibration period 311. A training or re-training of the prediction algorithm could then be effected on the basis of the corresponding pairs 601. By way of example, the prediction algorithm could already be pretrained, in principle, e.g. on the basis of other samples. A sample-specific adaptation of the prediction algorithm could then be effected in the context of the re-training.

By virtue of the reference images 261 and optionally the training images 251 and also the further measurement images 271 being captured during the calibration period 311 only after the conclusion of the observation period 301, it may moreover be possible to capture the sequence 200 of the measurement images 201 with a particularly high scanning rate, since the capture of the other images 251, 261, 271 need not additionally be interposed. A temporal dynamic range with a particularly high temporal resolution can be captured as a result.

FIG. 4 reveals that the calibration period 311—in particular that part of the calibration period 311 which is used for capturing the reference images 261—is shorter than the observation period 301. As a general rule, a length of the calibration period 311 could be not greater than 50%, optionally not greater than 10%, further optionally not greater than one percent, of the length of the observation period 301.

What can be achieved by means of such a comparatively short dimensioning of the calibration period 311 is that the period between capturing the reference images 261 and the further measurement images 271 and the point in time 399 at which staining is effected is comparatively short. What can in turn be achieved as a result is that a degradation of the marker, for example bleaching of fluorophores in the marker, is avoided. As a result, it is possible to prevent the fluorescence imaging used for capturing the reference images 261 from being corrupted. This may be helpful particularly if long-term experiments are carried out, in which the observation period 301 is particularly long, for example of the order of magnitude of hours or even days.

In some examples, it may be desirable to capture such a time dependence of the markers that are used for the fluorescence imaging. A corresponding example is discussed below in association with FIG. 5.

FIG. 5 illustrates aspects with regard to the capturing of measurement images 201 and the capturing of reference images 261 for the validating of a prediction algorithm. In particular, FIG. 5 illustrates aspects with regard to a corresponding temporal arrangement in relation to an observation period 301. FIG. 4 is one exemplary implementation of the techniques in accordance with TAB. 1: Example II.

In the example in FIG. 5, the reference images 261 for the validation are also captured during the observation period 301, that is to say in particular temporally in parallel with the measurement images 201. The reference images 261 are captured for a further sample 802. For example, the sample 801 and the further sample 802 could be situated in adjacent wells of a multi-well plate. The two samples 801, 802 could include identical cell cultures, that is to say e.g. cell cultures which are obtained by means of the same preparation process and are derived from the same biological material.

Further measurement images 271 are also captured for the further sample 802.

Particularly in the variant illustrated, a time dependence of the validation could be taken into account, i.e. the validation can be effected in a temporally resolved manner (or in a time-dependent manner). That means, therefore, that the validation may yield different results depending on the point in time. For example, it could be established that the quality of the validation decreases as a function of time during the observation period 301. This could be owing to the fact that the marker with which the further sample 802 was stained at the point in time 399 bleaches during the observation period 301—which is long e.g. in comparison with the calibration period 311.

Then—despite a comparatively poor correspondence between the further synthetic fluorescence images (determined on the basis of the further measurement images 271) and the reference images 261 towards the end of the observation period 301—the validation can be rated as successful.

The examples in FIG. 4 and FIG. 5 illustrate the fundamental variants in accordance with TAB. 1: Example I and Example II. Combinations would also be conceivable. By way of example, FIG. 6 illustrates a combination of the examples from FIG. 4 and FIG. 5. In the example in FIG. 6, the sample 801 is stained at the point in time 399-1 and the sample 802 is stained at the point in time 399-2. Such a scenario enables a particularly high quality of the validation and/or training. In the example in FIG. 7, the training images 251 are also captured for the sample 802. In FIG. 8, the training images 251 are captured from the further sample 802 prior to the observation period 301, during an upstream calibration period 312. As a result, it is possible, as early as during the observation period 301, to determine a prediction for the synthetic fluorescence images on the basis of the measurement images 201.

Even further variations are also conceivable. For example, it would be possible to capture firstly training images 251 and then reference images 271 for the validation in the calibration period 311. It would also be conceivable for the training images 251 and the reference images 271 to be acquired alternately or generally in an interleaved manner.

In summary, a description has been given above of techniques for validating and/or training a prediction algorithm, without the need to stain the biological sample with a corresponding marker for the fluorescence imaging prior to an observation period. For this purpose, firstly measurement images are captured from an unstained sample (or a sample stained with a different marker), during the observation period; after the observation period, reference images, and optionally training images, are acquired. The reference images could also be captured from a further sample.

It goes without saying that the features of the embodiments and aspects of the invention described above can be combined with one another. In particular, the features can be used not only in the combinations described but also in other combinations or on their own without departing from the scope of the invention.

By way of example, a description has been given above of techniques in which 2-D measurement images are subjected to digital post-processing in order to obtain synthetic fluorescence images. A prediction algorithm that operates on the basis of the 2-D measurement images is used for this purpose. As a general rule, it would also be conceivable for a prediction algorithm that operates on the basis of 3-D measurement images to be used.

Furthermore, techniques in association with digital contrast post-processing for the emulation of fluorescence contrast have been jointly described. Corresponding techniques could also be used for the emulation of other imaging modalities or application scenarios.

Furthermore, a description has been given above of techniques in which, by means of microscopic imaging, measurement images are captured by way of a (single) imaging modality, e.g. transmitted light, and then synthetic fluorescence images are determined on the basis of the measurement images captured by way of this (single) imaging modality. Sometimes it may be helpful to capture more measurement images by way of more than a single imaging modality for determining the synthetic fluorescence images, i.e. e.g. transmitted light and fluorescence imaging.

Moreover, a description has been given above of techniques in which a validation of a prediction algorithm is carried out on the basis of reference images. In principle, it would be conceivable to use the reference images and the assigned further measurement images for a training of the prediction algorithm instead of for the validation (in that case, the reference images may be referred to as training images).

What is claimed is:

1. A method for digital contrast post-processing of microscopy images, comprising:
    driving at least one imaging device in order to capture a plurality of measurement images of a biological sample by means of microscopic imaging during an observation period,
    after a staining process performed on the biological sample for the purpose of staining the biological sample with a marker for microscopic fluorescence imaging has been carried out after the observation period: driving the at least one imaging device in order to capture a plurality of reference images of the biological sample stained with the marker by means of the microscopic fluorescence imaging after the observation period during a calibration period,
    driving the at least one imaging device in order to capture further measurement images of the biological sample stained with the marker by means of the microscopic imaging during the calibration period,
    determining synthetic fluorescence images on the basis of the measurement images and on the basis of a prediction algorithm, wherein the prediction algorithm is machine-learned,
    determining further synthetic fluorescence images on the basis of at least one portion of the further measurement images and on the basis of the prediction algorithm,
    carrying out a validation of the synthetic fluorescence images on the basis of a comparison between the reference images and the further synthetic fluorescence images,
    driving the at least one imaging device in order to capture, by means of the microscopic fluorescence imaging, a plurality of training images of a further sample stained with the marker for the microscopic fluorescence imaging by means of the staining process,
    driving the at least one imaging device in order to capture a plurality of further measurement images by means of the microscopic imaging during a further calibration period, and
    carrying out a training of parameters of the machine-learned prediction algorithm on the basis of the training images as ground truth and the further measurement images captured during the further calibration period.

2. The method according to claim 1,
    wherein the prediction algorithm is machine-learned,
    wherein the method furthermore comprises:
        driving the at least one imaging device in order to capture training images of at least the biological sample stained with the fluorescence marker by means of the microscopic fluorescence imaging during the calibration period, and
        carrying out a training of parameters of the machine-learned prediction algorithm on the basis of the training images as ground truth and at least one portion of the further measurement images.

3. The method according to claim 2,
    wherein driving the at least one imaging device in order to capture the training images and the further measurement images of the biological sample stained with the fluorescence marker by means of the microscopic fluorescence imaging and carrying out the training are effected in an iterative loop with carrying out the validation until one or more termination criteria are satisfied.

4. The method according to claim 1,
    wherein the biological sample is unstained or is stained with a further fluorescence marker during the observation period.

5. A method for digital contrast post-processing of microscopy images, comprising:
    driving at least one imaging device in order to capture a plurality of measurement images of a biological sample by means of microscopic imaging during an observation period, wherein the biological sample is not stained with a marker during the observation period,
    driving the at least one imaging device in order to capture a plurality of reference images of a further biological sample stained with the marker by means of microscopic fluorescence imaging during the observation period,
    driving the at least one imaging device in order to capture further measurement images of the further biological sample stained with the marker by means of the microscopic imaging during the observation period,
    determining synthetic fluorescence images on the basis of the measurement images and on the basis of a prediction algorithm,
    determining further synthetic fluorescence images on the basis of at least one portion of the further measurement images and on the basis of the prediction algorithm, and
    carrying out a validation of the synthetic fluorescence images on the basis of a comparison between the reference images and the further synthetic fluorescence images, wherein the validation is carried out in a temporally resolved manner depending on a time position in the observation period.

6. A device for digital contrast post-processing of microscopy images, comprising a processor configured to:
    drive at least one imaging device in order to capture a plurality of measurement images of a biological sample by means of microscopic imaging during an observation period,
    after a staining process performed on the biological sample for the purpose of staining the biological sample with a marker for microscopic fluorescence imaging has been carried out after the observation period: drive the at least one imaging device in order to capture a plurality of reference images of the biological sample stained with the marker by means of the microscopic fluorescence imaging after the observation period during a calibration period, drive the at least one imaging device in order to capture further measurement images of the biological sample stained with the marker by means of the microscopic imaging during the calibration period, determine synthetic fluorescence images on the basis of the measurement images and on the basis of a prediction algorithm, wherein the prediction algorithm is machine-learned, determine further synthetic fluorescence images on the basis of at least one portion of the further measurement images and on the basis of the prediction algorithm, carry out a validation of the synthetic fluorescence images on the basis of a comparison between the reference images and the further synthetic fluorescence images, driving the at least one imaging device in order to capture, by means of the microscopic fluorescence imaging, a plurality of training images of a further sample stained with the marker for the microscopic fluorescence imaging by means of the staining process, driving the at least one imaging device in order to capture a plurality of further measurement images by means of the microscopic imaging during a further calibration period, and carrying out a training of parameters of the machine-learned prediction algorithm on the basis of the training images as ground truth and the further measurement images captured during the further calibration period.

7. The device according to claim 6, wherein the processor is configured to drive at least one imaging device in order to capture a plurality of measurement images of a biological sample by means of microscopic imaging during an observation period, wherein the biological sample is not stained with a marker during the observation period, drive the at least one imaging device in order to capture a plurality of reference images of a further biological sample stained with the marker by means of microscopic fluorescence imaging during the observation period, drive the at least one imaging device in order to capture further measurement images of the further biological sample stained with the marker by means of the microscopic imaging during the observation period, determine synthetic fluorescence images on the basis of the measurement images and on the basis of a prediction algorithm, determine further synthetic fluorescence images on the basis of at least one portion of the further measurement images and on the basis of the prediction algorithm, and carry out a validation of the synthetic fluorescence images on the basis of a comparison between the reference images and the further synthetic fluorescence images.

8. A device for digital contrast post-processing of microscopy images, comprising a processor configured to:

drive at least one imaging device in order to capture a plurality of measurement images of a biological sample by means of microscopic imaging during an observation period, wherein the biological sample is not stained with a marker during the observation period, drive the at least one imaging device in order to capture a plurality of reference images of a further biological sample stained with the marker by means of microscopic fluorescence imaging during the observation period, drive the at least one imaging device in order to capture further measurement images of the further biological sample stained with the marker by means of the microscopic imaging during the observation period, determine synthetic fluorescence images on the basis of the measurement images and on the basis of a prediction algorithm, determine further synthetic fluorescence images on the basis of at least one portion of the further measurement images and on the basis of the prediction algorithm, and carry out a validation of the synthetic fluorescence images on the basis of a comparison between the reference images and the further synthetic fluorescence images, wherein the validation is carried out in a temporally resolved manner depending on a time position in the observation period.

9. A method for digital contrast post-processing of microscopy images, comprising:

driving at least one imaging device in order to capture a plurality of measurement images of a biological sample by means of microscopic imaging during an observation period, after a staining process performed on the biological sample for the purpose of staining the biological sample with a marker for microscopic fluorescence imaging has been carried out after the observation period: driving the at least one imaging device in order to capture a plurality of training images of the biological sample stained with the marker by means of the microscopic fluorescence imaging after the observation period during a calibration period, driving the at least one imaging device in order to capture further measurement images of the biological sample stained with the marker by means of the microscopic imaging during the calibration period, determining synthetic fluorescence images on the basis of the measurement images and on the basis of a machine-learned prediction algorithm, carrying out a training of parameters of the machine-learned prediction algorithm on the basis of the training images as ground truth and at least one portion of the further measurement images, driving the at least one imaging device in order to capture, by means of the microscopic fluorescence imaging, a plurality of training images of a further sample stained with the marker for the microscopic fluorescence imaging by means of the staining process, driving the at least one imaging device in order to capture a plurality of further measurement images by means of the microscopic imaging during a further calibration period, and carrying out a training of parameters of the machine-learned prediction algorithm on the basis of the training images as ground truth and the further measurement images captured during the further calibration period.

10. A method for digital contrast post-processing of microscopy images, comprising:

driving at least one imaging device in order to capture a plurality of measurement images of a biological sample by means of microscopic imaging during an observation period, wherein the biological sample is not stained with a marker during the observation period, driving the at least one imaging device in order to capture a plurality of training images of a further biological sample stained with the marker by means of microscopic fluorescence imaging during the observation period, driving the at least one imaging device in order to capture further measurement images of the further biological sample stained with the marker by means of the microscopic imaging during the observation period, determining synthetic fluorescence images on the basis of the measurement images and on the basis of a machine-learned prediction algorithm, and carrying out a training of parameters of the machine-learned prediction algorithm on the basis of the training images as ground truth and at least one portion of the further measurement images, wherein the training of parameters is carried out in a temporally resolved manner depending on a time position in the observation period.

* * * * *